UNITED STATES PATENT OFFICE.

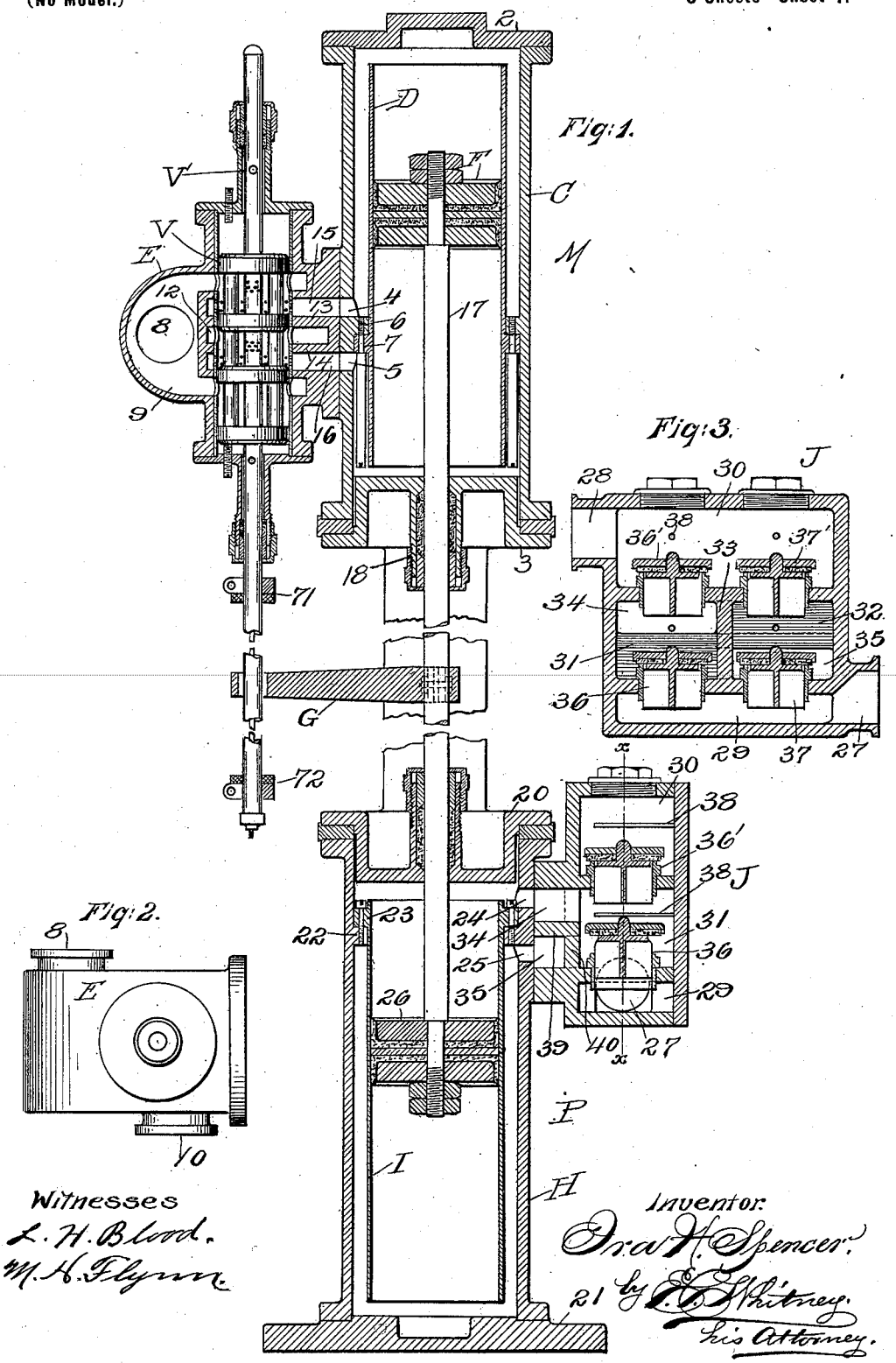

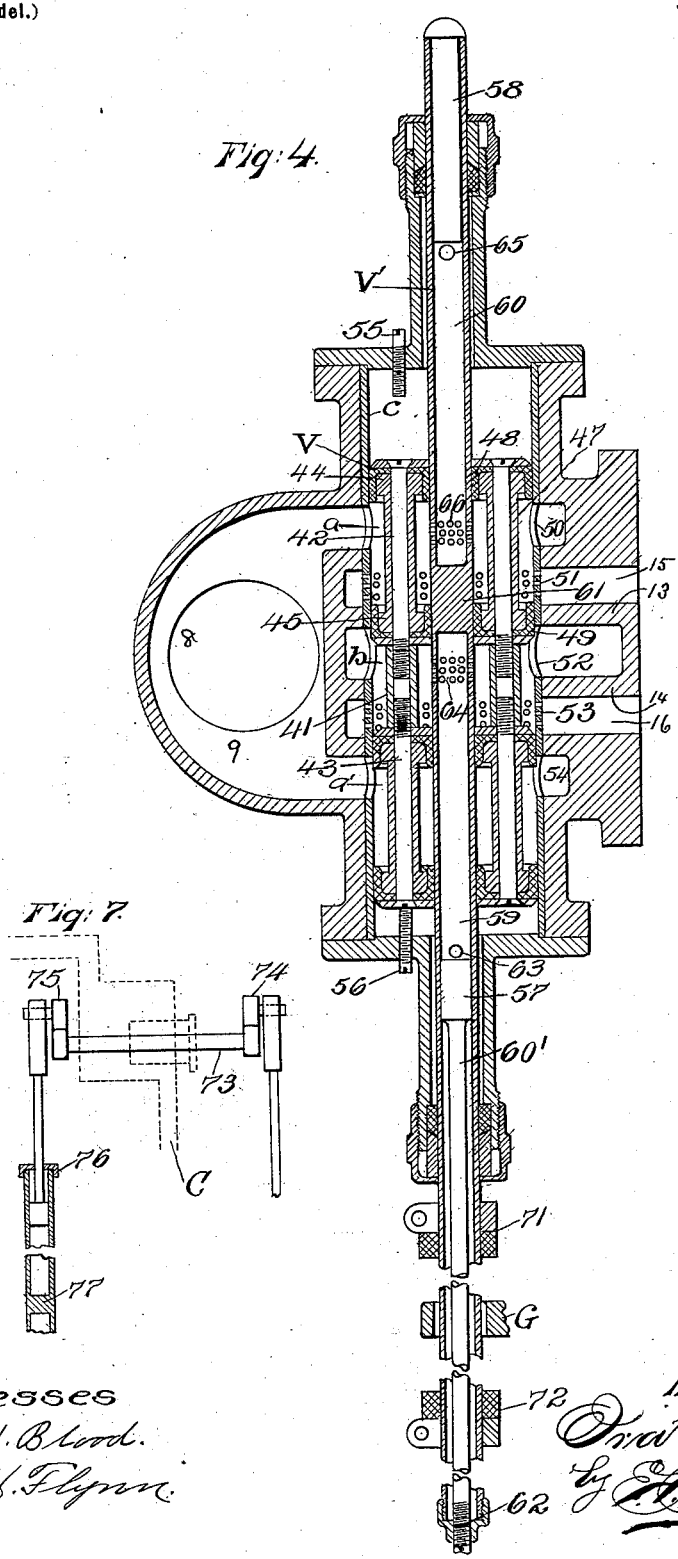

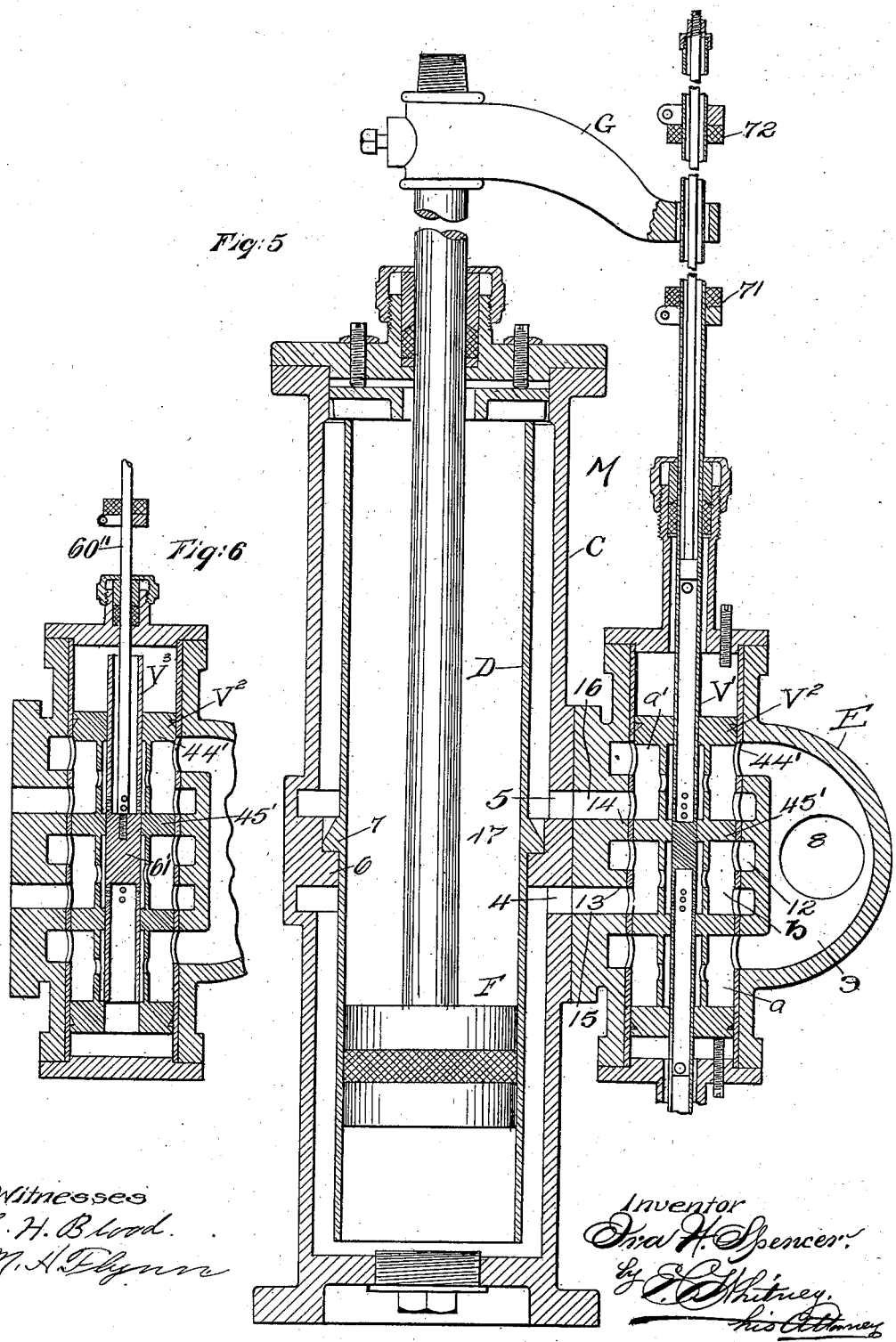

IRA H. SPENCER, OF HARTFORD, CONNECTICUT, ASSIGNOR TO THE L. E. RHODES COMPANY, OF SAME PLACE.

FLUID-MOTOR.

SPECIFICATION forming part of Letters Patent No. 663,135, dated December 4, 1900.

Application filed January 2, 1900. Serial No. 114. (No model.)

*To all whom it may concern:*

Be it known that I, IRA H. SPENCER, a citizen of the United States of America, and a resident of the city and county of Hartford, in the State of Connecticut, have invented certain new and useful Improvements in Fluid-Motors, of which the following is a specification.

This invention relates in a general way to hydraulic motors of the reciprocating class, and more specifically to that class of motors embodying pumping mechanisms and ordinarily termed "water-pressure engines" or "reciprocating motor-pumps."

One object of the invention is to produce a motor of improved, novel, simplified, and durable construction and organization in which the maximum efficiency is obtained at the minimum expense of power and in which means are provided whereby the motor or pump cylinder is supported at a point intermediate its ends within a surrounding casing, thereby to form two independent annular waterways around said cylinder, which are separated from each other by the cylinder-support, which constitutes also a dividing-wall between opposite ends of said cylinder, the construction and organization of said support or wall being such as to permit a slight lateral movement of the cylinder at opposite ends to compensate for any misalinement thereof with respect to the axial line of movement of the piston or plunger and at the same time facilitate the ready removal and replacement of cylinders of different diameters by any one without displacing the machine or disturbing any of the pipes or connections, thus enabling the user of the motor readily to adapt said motor to variations of fluid-pressure and secure economical and effective work at trifling expense.

A further object of the invention is to furnish, in connection with a motor or pump of the class specified, improved valve mechanism embodying two coöperative reciprocatory valves disposed concentrically with relation to each other, and one of which valves, termed for convenience the "main" or "fluid-actuated" valve, is controlled in its movements through the other valve, termed for convenience the "primary" or "mechanically-actuated" valve, and has at all times, except at two certain periods in the reciprocatory movements of the primary valve, (during which periods the main valve is accurately balanced,) an excess in fluid-pressure at one or the other end sufficient normally to retain said main valve in one or the other extreme position, the construction, organization, and operation thereof being such that when the primary valve is moved in one direction the main valve will immediately move in the opposite direction, thus positively obviating the possibility of the retarding or sticking of the main valve, rendering the operation of the main valve positive and unrestricted throughout its entire stroke, and thereby eliminating "dead" positions of said valve, which are objectionable characteristics in many motors of this class of ordinary construction.

With these objects in view the invention consists in certain details of construction and in the combination and arrangement of the several parts of the motor or reciprocating pump, substantially as hereinafter described, and more particularly set forth in the claims.

In the drawings accompanying and forming part of this specification, Figure 1 is a longitudinal central section of a motor embodying the present invention, the motor-piston and pump-plunger being shown in intermediate positions and assumed to be on the descent, the main valve being shown in its lowest extreme position and the primary valve in its extreme highest position, in which position pressure fluid is being admitted above the motor-piston, the fluid below said piston being concurrently exhausted, while at the same time fluid is being drawn into the pump-cylinder above the plunger and is being discharged from below said plunger. Fig. 2 is a plan view of the motor-valve chest detached. Fig. 3 is a vertical section of the supplemental or pump valve mechanism, the section being taken on a line corresponding with the dotted line $x$ $x$ in Fig. 1. Fig. 4 is a central vertical section, on an enlarged scale, of the motor-valve mechanism shown in Fig. 1. Fig. 5 is a central longitudinal section of the hydraulic motor proper, showing a slightly-modified construction of valve mechanism. Fig. 6 is a central longitudinal section of another slightly-modified form of motor-valve mechanism, the main valve being the same as that shown in Fig. 5, while the primary valve is slightly modified. Fig. 7 is a side elevation of a crank-and-link actuating connection between the piston-rod and primary valve.

Similar characters represent like parts in all the figures of the drawings.

The combined motor and pump in the construction and organization thereof shown in Fig. 1 of the accompanying drawings comprises a motor, which is designated in a general way by M and includes coöperative motor instrumentalities, and a pump, which is designated in a general way by P and which includes all the coöperative pump instrumentalities.

The motor *per se* comprises in the construction and organization thereof shown in Fig. 1 a cylinder-casing C, having suitable heads 2 and 3 at opposite ends and also having near the middle portion thereof horizontally-disposed waterways or ports 4 and 5, separated by an annular flange 6 and opening into annular fluid-spaces at opposite ends of said casing; a piston-cylinder D of a diameter less than the internal diameter of the casing C, supported intermediate its ends preferably by a support 7, secured to the annular flange, so that its opposite ends will be free from support or contact with the cylinder-casing heads; a motor-valve chest E, secured to one side of the casing near the middle portion thereof, and having a symmetrical valve-cylinder-receiving bore extending from end to end thereof, and in which bore is secured a valve-cylinder c, extending the entire length thereof and perforated at different points, and said chest also having inlet and exhaust ports 8 and 10, respectively, which communicate with a pressure-fluid chamber 9 and a dead-fluid chamber 12, respectively, which surround the valve-cylinder c and communicate with the interior thereof through the perforation therein, and said chest E also having horizontally-disposed valve-controlled ways or passages 15 and 16, registering, respectively, with the horizontal ways 4 and 5 of the cylinder-casing C, and which ways 15 and 16 are separated from the dead-fluid chamber by horizontal bridge-walls 13 and 14 and from the pressure-fluid chamber by similarly-disposed bridge-walls, all of which walls are parallel and having valve-controlled openings for establishing communication between the pressure-fluid chamber and first one and then the opposite end of the piston-cylinder alternately and between the exhaust-chamber and first one and then the opposite end of said cylinder alternately; a piston F, working in the piston-cylinder D and having a piston-rod 17 extending through a suitable stuffing-box 18 and, as shown in said Fig. 1, secured to a plunger of a pump P; two coöperative valves V and V', concentrically-disposed in the valve-chamber c and one of which valves, as V, (herein termed the "main" or "fluid-actuated" valve,) is controlled by the other valve V', (herein termed the "primary" or "mechanically-actuated" valve,) which in turn is operated through the piston F, and a valve-actuator G, operatively connecting the valve V' and piston-rod 17.

The pump P, *per se*, in the preferred construction and organization thereof shown in Fig. 1 comprises a pump-cylinder casing H, which is in a general way similar to the motor-cylinder casing C, it having suitable heads 20 and 21 at opposite ends and an intermediate annular flange 22; a pump-plunger cylinder I, having an external annular flange 23, secured to the internal annular flange 22 in such manner as to form an annular waterway around both ends of said cylinder, and also having fluid-ways 24 and 25 leading outward from the annular waterways surrounding said cylinder; a plunger 26, working in said cylinder and connected to the piston of the motor M by the piston-rod 17, as before stated; a pump-valve chest J, having an inlet-port 27 and an exhaust-port 28 leading to an inlet and an outlet fluid-chamber 29 and 30, respectively, said chest also having two intermediate chambers 31 and 32, respectively, separated from each other by a dividing-partition 33 and having waterways 34 and 35, which communicate with the passage-ways or ports 24 and 25, respectively, which lead to the pump-cylinder, and two sets of puppet-valves comprising two valves each, which valves are designated by 36, 36', and 37 and 37', respectively, and one set of which controls the admission and discharge of fluid from one chamber, as 31, and the other set of which controls the admission and discharge of fluid from the other chamber, as 32, as will readily be understood by reference to Figs. 1 and 3.

The pump-valve chest, which may be of any suitable general construction, is preferably provided with a removable plate, whereby access may be had to the interior of said chest, and inwardly-projecting pins or abutments will be provided, as shown at 38, above the valves to limit the vertical or opening movement of said valves.

By reference to Figs. 1 and 3 it will be seen that the passage-ways 34 and 35 are separated from each other by the horizontal bridge-wall 39 and that the passage-way 35 is separated from the chamber 31 by the partition or bridge-wall 39 and the vertically-disposed wall 40.

By reference to the accompanying drawings it will be seen that all ports and waterways are substantially straight and have no crooks or bends to form convenient repositories for dirt or foreign matter, but, on the contrary, are naturally kept clean by the flow of fluid through them.

For securing the best results in operation, efficiency in packing, lightness and durability in construction, and adjustability and interchangeability of parts the main or fluid-actuated valve V in the preferred form thereof shown in Figs. 1 and 4 comprises two skeleton-like end portions and a similar middle portion, designated by $a$, $a'$, and $b$, respectively, the middle portion, which constitutes a separator between the two end portions, consisting of a plurality of tubular separators 41, internally screw-threaded at their ends to receive stays or screws 42 and 43, which extend through the end portions $a$ $a'$, respectively, and secure said portions to said middle portion $b$. Each end portion of the valve V is preferably a duplicate of the other and consists, in the form shown in said Figs. 1 and 4, of two centrally-perforated disks 44 and 45, having a plurality of screw-holes to receive the screws, a plurality of separators disposed between and connecting the heads or disks 44 and 45, which separators are shown as tubular in construction, and will in practice preferably be cast integral with the two heads, said separators being designated by 47, and two packing-rings 48 and 49, each having two concentric flanges, the outer one of which surrounds the valve head or disk and the inner one of which forms a fluid-tight joint between the main and primary valves, as will be readily understood by reference to Fig. 4.

For the purpose of securing the best possible results in the operation of the main or fluid-actuated valve V, irrespective of the pressure of fluid and irrespective of the motor speed, it is necessary to so construct the valve mechanism that the main valve will have no tendency to move prematurely and cause the motor to "short stroke," as most motors will under high water-pressure. It is also necessary that the main valve shall be perfectly balanced at all times other than when the primary valve receives its impulse near the end of the piston-stroke to permit the ingress of live fluid to one end of the main valve and the egress of dead fluid from the opposing end of said valve, whereby to secure an immediate response and a positive movement of the main valve due to the increased and diminished pressure at opposite ends of said main valve. Further, it has been found by long and exhaustive practical experiments that to maintain a nicety in balance of the main valve it is important that the main and primary valves have their movements substantially concurrently in opposing directions and to so locate the ports in the primary valve with respect to the fluid-spaces between the flanges or disks of the main valve and with respect to the fluidways of the valve-chest that the ports in said primary valve will be opened to their fullest extent in the minimum length of time on the inaugural movement of said primary valve. Further, it has been found highly advantageous to so construct the valve mechanism that all ports are bound to open wide no matter how slowly the motor is working, thus making it practically impossible for the motor to catch or stop, and to secure these ends the main valve V is so constructed that all of its four disks or heads have substantially the same effective areas and are disposed substantially equidistant, so as to provide fluid-spaces between said disks having substantially the same effective areas, and the primary valve V' is centrally disposed with relation to and is extended entirely through said main valve and has at its opposite ends two axially-alined fluid-chambers, each of which is symmetrical from end to end—that is, said chambers are separated at their inner ends by a discous wall disposed at right angles to the axis of said chambers and each chamber has the same effective area at both ends, the construction of the primary valve being such as regards its port-openings as to secure the best possible results and which construction will be hereinafter described.

To form a tight seat for the valve V, the motor-valve chest is furnished with a valve-cylinder $c$, which is perforated at different points in the length thereof, as at 50, 51, 52, 53, and 54, which communicate with the adjacent waterways in said valve-chest, and as a convenient means for regulating the stroke of valve V set-screws 55 and 56 are shown extended through opposite heads of the valve-chest with their inner ends located in the path of said valve, so that a simple adjustment of said screws will effect a change in the stroke.

The primary valve V' is preferably in the nature of a rod (see Figs. 1 and 4) extending through the center of the valve V and supported for reciprocatory movements independent of the main valve V, said rod being bored from opposite ends inward to form fluid-chambers 59 and 60 of proper area, which are separated relatively by a transverse bridge-wall 61, extending in a straight line from side to side of said valve and which fluid-chambers are each of the same cross-sectional area at both ends. One of these chambers, as 60, is shown plugged at 58, which may be screwed into the outer end thereof, while the other chamber, as 59, is shown furnished with a fluid-check 57, which is shown as a plunger or plug having a stem 60', having a screw-threaded outer end 62, having a bearing in a cap or nut secured to the outer end of the primary valve, this stem being shown notched at its outer end, whereby it may be turned to move the plug inward or outward with relation to said valve V'. Each valve-chamber 59 and 60 is perforated at or near both ends thereof, the chamber 59 at 63 and 64 and the one 60 at 65 and 66, these perforations being so disposed with relation to the valve V that when the primary or tube valve V' is in the position shown in Figs. 1 and 4 and the main valve is in the position shown in said figures, in which case fluid is entering the upper end of the piston-cylinder and is being exhausted from the lower end of said cylinder, the perforations 63 and 65 at the outer ends of both chambers 59 and 60, respectively, will communicate with the spaces at opposite ends of the main valve V, while the perforations 64 of the inner end of chamber 59 will communicate with the exhaust-chamber 12 of the valve-chest, and the perforations 66 at the inner end of chamber 60 will at the same time communicate with the fluid-pressure chamber 9 in said chest, thus permitting the dead fluid below the main valve V to be exhausted and admitting live or pressure fluid to the space above said main valve, whereby to keep the main valve in its extreme lowest position until the primary valve V' is shifted to bring the chamber 59 thereof into communication with the fluid-pressure chamber 9 and the chamber 60 into communication with the exhaust-chamber, at which time the main valve will be immediately shifted by the pressure of fluid admitted to the lower end thereof to its extreme upper position and in position to admit pressure fluid to the lower end of the piston-cylinder D, as will be readily understood by reference to the said figures.

The valves V and V' are so disposed relatively and the perforations in the primary valve V' are so located that on a movement of the primary valve V' in one direction the main valve will as soon as an inner port of the primary valve has moved from a position in communication with the exhaust-chamber to a position in communication with the pressure-fluid chamber of the valve-chest be immediately moved or shifted by fluid-pressure in a direction opposite to that in which the primary valve is moving. Thus the two valves are at one period simultaneously moving in opposing direction. The two inner ports of the primary valve are brought by the movements of said valve into communication, one with the exhaust-chamber and the other with the pressure-fluid chamber, concurrently, so that live fluid will be admitted to one end of the main valve and the dead fluid will be expelled from the opposite end of said valve in proportion one to the other, thus effecting a positive unrestricted movement of the main valve and obviating any tendency to short stroke, as no live fluid can be admitted to one end of the valve until the exhaust is opened to the opposite end.

The construction of the main valve is such that irrespective of its position a circulation of pressure fluid about both ends between disks 44 and 45 is maintained as well as a circulation of exhaust fluid about the middle portion $b$, which keeps the valve balanced until additional pressure is admitted to one or the other end of said valve by the operation of the primary valve.

The invention is not limited to the specific construction of main valve shown in Figs. 1 and 4, as a one-piece valve, such as shown in Figs. 5 and 6 and designated by $V^2$, may be employed, it having a series of four disks or head-flanges, which correspond to the disks 44 and 45 of the main valve (shown in Figs. 1 and 4) and which are designated by 44' and 45', respectively. This valve $V^2$ is somewhat in the nature of a tube having annular peripheral flanges at opposite ends and also having two similar intermediate flanges, the tubular portions of said valve being perforated at points between flanges to admit fluid to the center of said tube, as will be readily understood by reference to Figs. 5 and 6. The valve-chest used in connection with this valve $V^2$ is the same as the chest shown in Figs. 1 and 4, and the parts thereof are designated by the same characters as are like parts in said Figs. 1 and 4.

In Fig. 6 the primary valve, which is in this figure designated by $V^3$, is shown as a relatively short tube-valve open at both ends and terminating wholly within the main-valve cylinder, said valve having a central solid portion or bridge 61', into which is screwed the inner end of an actuating stem or rod 60'', which extends through the head of the valve-case. This primary valve $V^3$ is wholly supported within the main valve $V^2$, bearings therefor being formed in opposite ends of said main valve, as shown in Fig. 6. The mode of operation of the primary valve $V^3$ being substantially the same as that of the primary valve V', heretofore described, it is deemed unnecessary to enter into a detail description of the mode of operation of this valve $V^3$.

In the drawings there are shown two modified constructions of actuating-connector between the primary valve and the motor piston-rod. In Figs. 1 and 4 this actuating-connector is shown as the well-known valve-actuator, it consisting of an arm G, fixed to the piston-rod and having its outer end perforated to surround the valve-stem and which end acts against abutments 71 and 72 alternately, which are fixed to the valve-stem at proper distances apart, said abutments being adjustably secured to said stem whereby to regulate the stroke of the valve according to the stroke of the piston. In Fig. 7 the actuating-connector between the piston-rod and the valve-stem is shown as a crank-shaft 73, journaled in suitable bearings in the upper end of the piston-cylinder casing and having cranks 74 and 75 at opposite ends thereof, having pins which engage in slots in a pitman shiftably connected to the upper end of the piston-rod and in the valve-stem, respectively. In this construction and organization of actuating-connector the piston-rod is hollow at the upper end to receive the lower headed end of the pitman and is furnished with two remote abutments 76 and 77, which act against the head of the pitman on the up-and-down stroke of the piston, thereby to impart a rotative movement to the crank-shaft and actuate the valve-stem and valve, as will readily be understood.

In Fig. 5 of the drawings the motor is shown in an inverted position as compared with the position shown in Fig. 1 and is shown provided with a suitable base, whereby to adapt it for use simply as a hydraulic motor for operating an organ-bellows or other device, no pump being shown in connection therewith.

By providing the adjustable plug 57 in connection with the primary valve V' the effective area of the hole or perforation 63 in the chamber 59 may be regulated, whereby to restrict the admission of fluid to the chamber during the movement of the main valve in toward this perforation, and thereby cushion the valve to a certain extent and prevent a too rapid stroke of said valve, thus obviating jarring impact or impingement and rendering the operation thereof practically noiseless.

By the employment of valve mechanism such as hereinbefore described, embodying a main and a primary valve constructed as set forth, the primary or mechanically-actuated valve V' is bound to have its ports or perforations opened wide on any movement of said valve, and on account of the positive balance of the main valve V the tendency to premature operation of said main valve is positively obviated, thus preventing the short-stroking of the motor and also rendering it impossible for the motor to catch or stop.

The operation of the motor-pump will be readily understood by any one conversant with the art by a comparison of the several figures of the drawings, and therefore need not herein be described in detail.

In the preferred construction (shown most clearly in Figs. 1 and 4 of the drawings) the primary valve V' not only extends entirely through the main valve V, but also extends through the valve-chest, it being supported in suitable stuffing-boxes at opposite ends of said chest, and the fluid-check 57, whereby the effective area of the perforation 63 in the fluid-chamber of said primary valve is regulated, is supported for movement longitudinally of said fluid-chamber and has a stem 60' in axial alinement with and extending beyond the end of said valve, whereby the same may be adjusted longitudinally of the valve outside the valve-chest and valve mechanism, thus permitting the same to be adjusted while the motor is in operation, the outer end of the stem of the fluid-check being shown screw-threaded and having a screw-threaded bearing-cap secured to the extreme end of the primary valve, thus forming a convenient means of adjustment.

I claim—

1. The combination, with a valve-chest, of two concentrically-disposed reciprocatory valves one of which extends entirely through the center of the other and has two relatively-separated fluid-chambers at opposite ends thereof each chamber of which has the same cross-sectional area at both ends and has port-openings at opposite ends thereof; a fluid-check supported centrally for adjustment longitudinally of, and in axial alinement with, one of said valves and having means at one end thereof located outside the valve-chest whereby to adjust the same; and a valve-stroke-limiting device adjustably secured in the valve-chest in the path of movement of the outer valve.

2. In a motor, the combination, with a valve-chest having a perforated valve-receiving cylinder of uniform internal diameter from end to end, and also having a central exhaust-chamber surrounding the valve-cylinder and a pressure-fluid chamber having portions surrounding opposite ends of the valve-cylinder, and which chest also has two horizontal fluid-passages located, respectively, at opposite sides of the exhaust-chamber and separated therefrom and from the pressure-fluid chamber by bridge-walls surrounding the valve-cylinder; of a balanced fluid-actuated main valve wholly located within the valve-cylinder and having three fluid-compartments of substantially corresponding areas the middle one of which is in constant communication with the exhaust-chamber and the two end ones of which are in constant communication with opposite ends, respectively, of the pressure-fluid chamber; a mechanically-actuated primary valve extending concentrically entirely through the main valve and having a tubular portion extending through the valve-chest, and also having at opposite ends thereof fluid-chambers each of which are of the same cross-sectional area at both ends and both of which have at their outer ends a port-opening in constant communication with the space between the end of the valve and extreme end of the valve-cylinder, and each of which has port-openings at its inner end alternately communicative with the pressure-chamber and exhaust-chamber; a fluid-check located in one of the fluid-chambers of the primary valve and having a stem extending entirely through the tubular portion of said valve and also having a screw-threaded bearing in a cap fixed to the outer end of said tubular portion whereby said check may be adjusted longitudinally of the fluid-chamber to regulate the effective area of the port-opening thereof; and a valve-stroke limiter adjustably supported within the valve-cylinder in the path of movement of the main valve.

3. The combination, with the valve-chest, of a main valve comprising two skeleton-like end portions and a skeleton-like middle portion, each end portion of which consists of two centrally-perforated disks, a plurality of tubular separators connecting the two disks, two packing-rings having annular flanges of different diameters overlapping the outer and inner edges of the disks; and the middle portion of which consists of a plurality of tubular separators interposed between the two end portions and having internal screw-threaded outer and inner ends; and a plurality of screws extending through the disks and separators of each end portion and having screw-threaded bearings in the tubular separators of the middle portion.

4. In a motor, the combination, with a valve-chest, and with a fluid-actuated main valve working in said chest, of a mechanically-actuated primary valve for controlling the movements of the main valve and having a fluid-chamber at one end thereof with port openings or perforations leading therefrom; actuating means for the primary valve; and a fluid-check extending into the fluid-chamber and adjustable longitudinally thereof from a point outside the valve-chest for controlling the ingress and egress of fluid to and from the fluid-chamber.

5. In a motor of the class specified, the combination, with a valve-chest having a pressure-fluid chamber and an exhaust-chamber, of two coöperative concentrically-disposed valves working in said chest and one of which is fluid-actuated and the other of which is mechanically actuated and controls the movements of the former, and the mechanically-actuated valve of which has two independent fluid-chambers having ports or perforations at their outer ends in constant communication with the spaces at opposite ends of said fluid-actuated valve and having ports or perforations at their inner ends each of which communicates alternately with the pressure-fluid and exhaust chambers; means for shifting the primary valve alternately in opposite directions to bring the ports at the inner ends of its chambers into communication alternately, with the pressure-fluid chamber and exhaust-chamber of the chest; and a fluid-check extending into a fluid-chamber in said primary valve and adjustable longitudinally thereof for regulating the effective area of a port in the primary valve, and having its adjusting means located outside the valve-chest whereby the same may be adjusted without stopping the mechanism.

6. A motor of the class specified embodying a piston-cylinder casing; an open-ended piston-cylinder supported intermediate its ends in said casing whereby to form annular fluid-ways around both ends of the cylinder; a piston working in said cylinder; a valve-chest secured to the cylinder-casing at one side thereof and having a symmetrical valve-cylinder-receiving bore extending from end to end thereof; a valve-cylinder in said bore; a pressure-fluid chamber surrounding opposite ends of said cylinder; an exhaust-chamber surrounding the central portion of said valve-cylinder; two horizontal fluid-ways surrounding intermediate portions of said valve-cylinder and communicating with the annular fluid-ways surrounding opposite ends of the piston-cylinder and separated from the pressure-fluid chamber and exhaust-chamber by horizontal bridge-walls having valve-controlled openings; perforations leading from the interior of the valve-cylinder to the pressure-chamber, exhaust-chamber, and horizontal fluid-ways of the valve-chest; a fluid-actuated valve embodying two end and one middle compartment of corresponding effective areas separated by equidistant disks of the same inner and outer surface areas and the two end compartments of which constantly communicate, through the end perforations of the valve-cylinder, with the opposite ends of the pressure-fluid chamber, and the middle compartment of which is constantly in communication with the exhaust-chamber and alternately communicates with the horizontal fluid-ways; a primary valve extending centrally entirely through the fluid-actuated valve two central relatively-separated fluid-chambers in opposite ends of the primary valve, and each of which is of the same cross-sectional area from end to end; a port-opening at the outer end of each valve-chamber and constantly communicating with the space beyond the end disk of the fluid-actuated valve; a port-opening at the inner end of each chamber and communicative alternately with the middle and end compartments of the fluid-actuated valve; and mechanically-actuated means connecting the piston and primary valve and effective for reciprocating said primary valve, whereby on movement of the mechanically-actuated valve in one direction the fluid-actuated valve will be moved by the pressure-fluid concurrently in an opposing direction.

7. The combination with a piston-cylinder casing having a piston-cylinder supported therein and having annular separated fluid-ways communicating with opposite ends of said cylinder, of a valve-chest secured to the side of said casing and having a perforated valve-cylinder, of uniform diameter from end to end, therein; two relatively-separated horizontal ports surrounding central portions of said valve-cylinder and communicating, respectively, with the fluid-ways surrounding opposite ends of the piston-cylinder; an annular exhaust-chamber disposed between the two horizontal ports and surrounding the middle portion of the valve-cylinder; a pressure-fluid chamber in said valve-chest surrounding opposite ends, respectively, of the valve-cylinder; horizontal walls surrounding those portions of the valve-cylinder intermediate the pressure-fluid chamber, the ports, and exhaust-chamber; a fluid-actuated main valve disposed in said valve-cylinder and consisting of four centrally-perforated disks of corresponding diameters connected together to form two end compartments and one middle compartment of corresponding areas, the two end compartments of which are at all times in communication with the pressure-fluid chamber and the middle compartment of which is at all times in communication with the exhaust-chamber and one or the other ports at one or the other side of said exhaust-chamber; a mechanically-actuated primary valve extending entirely through the central perforations of the four disks; two relatively-separated vertically-alined fluid-chambers centrally contained in opposite ends of said primary valve and each chamber of which is of the same diameter from end to end; two port-openings communicating with opposite ends, respectively, of each primary-valve fluid-chamber, the outer ports of which primary-valve chambers are in constant communication with the space outside of the two end disks of the main valve, and the inner ports of which chambers are so disposed that when the main valve is in its lowest position the inner port of the upper valve-chamber will communicate with the upper end compartment of the main valve and with the pressure-fluid chamber, and the inner port of the lower valve-chamber will communicate concurrently with the middle compartment of the main valve and with the exhaust-chamber; a piston supported in the piston-cylinder and having a piston-rod; and an actuating-connector between the piston-rod and primary valve.

Signed by me at Hartford, Connecticut, this 27th day of December, A. D. 1899.

IRA H. SPENCER.

Witnesses:
  E. C. WHITNEY,
  M. H. FLYNN.